United States Patent
Schornstein et al.

(10) Patent No.: US 9,868,831 B2
(45) Date of Patent: Jan. 16, 2018

(54) COMPOSITE FIBRE COMPONENTS AND THE PRODUCTION THEREOF

(71) Applicant: Covestro Deutchland AG, Monheim am Rhein (DE)

(72) Inventors: Marcel Schornstein, Neuss (DE); Florian Hupka, Dusseldorf (DE); Dirk Wegener, Monheim (DE); Harald Rasselnberg, Dormagen (DE)

(73) Assignee: COVESTRO DEUTSCHLAND AG, Leverkusen (DE)

( * ) Notice: Subject to any disclaimer, the term of this patent is extended or adjusted under 35 U.S.C. 154(b) by 0 days.

(21) Appl. No.: 15/307,649

(22) PCT Filed: Apr. 24, 2015

(86) PCT No.: PCT/EP2015/058949
§ 371 (c)(1),
(2) Date: Oct. 28, 2016

(87) PCT Pub. No.: WO2015/165823
PCT Pub. Date: Nov. 5, 2015

(65) Prior Publication Data
US 2017/0051120 A1 Feb. 23, 2017

(30) Foreign Application Priority Data

Apr. 28, 2014 (EP) .................... 14166254

(51) Int. Cl.
| | | |
|---|---|---|
| *C08J 5/04* | (2006.01) |
| *B29C 70/06* | (2006.01) |
| *B29C 70/48* | (2006.01) |
| *C08J 5/24* | (2006.01) |
| *C08G 18/48* | (2006.01) |
| *C08G 18/66* | (2006.01) |
| *C08G 18/76* | (2006.01) |
| *C08G 18/20* | (2006.01) |
| *C08G 18/28* | (2006.01) |
| *C08G 18/32* | (2006.01) |
| *B29K 75/00* | (2006.01) |
| *B29K 105/00* | (2006.01) |
| *B29K 309/08* | (2006.01) |
| *B29L 7/00* | (2006.01) |

(52) U.S. Cl.
CPC .............. *C08J 5/043* (2013.01); *B29C 70/06* (2013.01); *B29C 70/48* (2013.01); *C08G 18/2063* (2013.01); *C08G 18/284* (2013.01); *C08G 18/3206* (2013.01); *C08G 18/4812* (2013.01); *C08G 18/4825* (2013.01); *C08G 18/4829* (2013.01); *C08G 18/6677* (2013.01); *C08G 18/7664* (2013.01); *C08J 5/24* (2013.01); *B29K 2075/00* (2013.01); *B29K 2105/0002* (2013.01); *B29K 2309/08* (2013.01); *B29L 2007/002* (2013.01); *C08J 2375/04* (2013.01); *C08J 2375/06* (2013.01); *C08J 2375/08* (2013.01)

(58) Field of Classification Search
CPC ....... C08J 5/043; C08J 2375/08; B29C 70/48; B29C 70/06
See application file for complete search history.

(56) References Cited

U.S. PATENT DOCUMENTS

| | | | |
|---|---|---|---|
| 5,468,832 A | 11/1995 | Schrader et al. | |
| 5,973,099 A * | 10/1999 | Nodelman | C08G 18/088 264/328.4 |
| 6,448,364 B1 * | 9/2002 | Clatty | C08G 18/225 264/328.1 |
| 2004/0094859 A1 * | 5/2004 | Cheolas | B29C 33/60 264/136 |
| 2014/0087196 A1 | 3/2014 | Linder et al. | |

OTHER PUBLICATIONS

International Search Report and Written Opinion for International Application No. PCT/EP2015/058949, European Patent Office, dated Jul. 28, 2015.

* cited by examiner

*Primary Examiner* — Robert Harlan
(74) *Attorney, Agent, or Firm* — K&L Gates LLP

(57) ABSTRACT

The present invention fiber composite components obtainable, for example, by impregnating fibers with a reactive polyurethane resin mixture of polyisocyanates, polyols, thermo-latent catalysts and optionally additives, and to a method for the production thereof.

6 Claims, No Drawings

COMPOSITE FIBRE COMPONENTS AND THE PRODUCTION THEREOF

CROSS-REFERENCE TO RELATED APPLICATIONS

This application is a U.S. national stage application, filed under 35 U.S.C. §371, of PCT/EP2015/058949, which was filed on Apr. 25, 2015, and which claims priority to European Patent Application No. EP 14166254.4, which was filed on Apr. 28, 2014, the contents of each of which are incorporated by reference into this specification.

FIELD OF THE INVENTION

The present invention relates to fiber composite components obtainable, for example, by impregnating fibers with polyurethane reactive resin mixtures composed of polyisocyanates, polyols, thermolatent catalysts and optionally additives, and to a process for production thereof.

BACKGROUND

Polymer-based fiber composite materials are frequently used as construction material, since they have high mechanical strength combined with low weight. The matrix material typically consists of unsaturated polyester resins, vinyl ester resins or epoxy resins.

Fiber composite materials can be used, for example, in aircraft construction, in automobile construction or in rotor blades of wind power plants.

U.S. Pat. No. 5,973,099 A describes the production of compact polyurethanes with a thermolatent reactive resin mixture. The compact polyurethanes are preferably produced in an RTM method and, because of the use of polyols based on long-chain fatty acid derivatives, have low water absorption and therefore improved mechanical properties. A disadvantage is that the heat distortion resistance of the matrix is very low. In addition, the mold has to be primed prior to use with an external mold release agent for adequate demoldability. Moreover, the system has curing times of >10 minutes at a given processing temperature.

WO 2012163845 A1 describes the production of fiber composite components obtainable by impregnating fibers with a reactive resin mixture composed of polyisocyanates, dianhydrohexitols, polyols and optionally additives, and a process for production thereof. Preference is given here to using the vacuum assisted resin transfer molding (VARTM) and the resin transfer molding (RTM) methods. A disadvantage of the reactive resin mixtures is that they have a very long pot life at 35° C., and the viscosity rises only very gradually. Even at 80° C., curing of the reaction matrix over several hours is necessary.

DE 4416323 A describes heat-curable reactive resin mixtures comprising organic polyisocyanates, organic compounds having epoxy groups, and mixtures of particular tertiary amines (catalysts). The reactive resin mixtures are partly cured at temperatures up to 80° C. and fully cured at temperatures of 100 to 200° C. A disadvantage of these reactive resin mixtures is that they cure only at high temperatures and have long cycle times, which in turn leads to high energy and production costs.

The production of fiber composite materials by the preferred RTM method can in principle be divided into five stages: 1. mold preparation (for example polishing of the mold, application of the external mold release agent), 2. injection of the reactive resin into the mold, 3. curing of the reactive resin in the mold, 4. aftertreatment of the demolded fiber composite components by, for example, heat treatment, surface cleaning, etc., 5. painting, lamination or application of a decorative layer.

US 20040094859 A1 describes polyisocyanurate systems for production of fiber composite components by the pultrusion method. The polyisocyanurate systems described therein are equipped with internal mold release agent. In the pultrusion method, through the introduction of internal mold release agents, phase instability is exploited, in order that the pultrudates can be guided through the heated mold and do not stick therein. Because of this phase instability, it is not possible to use polyisocyanurate systems of this kind for the production of fiber composite components by the RTM method. Moreover, polyisocyanurate systems without subsequent heat treatment of the components at high temperatures have only a low NCO conversion of <90%.

In the case of the reactive resins used to date, the disadvantage is that every production of a fiber composite component has to be preceded by initial cleaning of the mold followed by priming again with an external mold release agent in a laborious manner. Specifically in the case of complex components, this is a costly step. Moreover, the reactive resins used to date have the disadvantage that it takes a long time until the reactive resin mixture has cured, which leads to low productivity. To increase the productivity, it is necessary to reduce the cycle time in the course of production. It is important here that the reactive resin mixture is mobile for long enough to completely impregnate the fibers, especially in the case of large moldings. On the other hand, the curing time should be very short, in order to reduce the cycle time. For economic reasons, a low curing temperature is desirable, since energy costs can be saved thereby.

SUMMARY

It was therefore an object of the present invention to provide a polyurethane matrix material which is equipped with internal mold release agent in such a way that fiber composite components can be produced without the use of external mold release agents, and which is additionally phase-stable, has thermolatent reaction characteristics at elevated temperatures, i.e. at first is mobile for long period (has a long pot life), in order to enable good impregnation and wetting of the fibers, but then very quickly gains in viscosity ("snap-cure"), and the component formed therefrom, immediately after production, without complex aftertreatment, permits painting, lamination or application of a decorative layer. In order to prevent any further reaction with air humidity, for example, a reaction conversion (NCO conversion) of the matrix material of at least 90% directly after the demolding of the component is desirable.

The object is surprisingly achieved by fiber composite components obtainable from fibers and reactive resin mixtures formed from specific polyisocyanates, polyols, thermolatent catalysts and optionally additives, wherein the polyol side has been equipped with internal mold release agent.

DETAILED DESCRIPTION OF THE INVENTION

The invention provides fiber composite components based on polyurethane, comprising one or more fiber layers each impregnated with polyurethane, wherein the polyurethane is obtainable from a reaction mixture consisting of A) one or more organic NCO prepolymers having an NCO content of 27% to 31% by weight and a monomer content of 35% to 55% by weight from the group consisting of reaction products of aliphatic, cycloaliphatic and/or aromatic di- and/or polyisocyanates and 5% to 7.5% by weight, based on component A), of condensation products which have ester groups, each have a number-average molecular weight of 650 to 3000 g/mol, an acid number of less than 5, a hydroxyl number of 28 to 112 and in each case a number-average functionality of 1.0 to 3.0, and are formed from one or more fatty acids having 10 to 30 carbon atoms, one or more low molecular weight aliphatic and/or aromatic di- and/or tricarboxylic acids each having number-average molecular weights of 50 to 500 g/mol and/or derivatives thereof and one or more mono- or polyhydric alcohols each having a number-average molecular weight up to 500 g/mol and each having a number-average functionality of 1.5 to 6, B) a component comprising one or more polyols each having a number-average molecular weight of 62 to 3000 g/mol and each having a number-average functionality of 1.8 to 6, C) two or more thermolatent catalysts and D) optionally additives, characterized in that component B) contains 2.5% to 3.5% by weight, based on component B), of internal mold release agent and the internal mold release agent is selected from the group consisting of condensation products which have ester groups, each have a number-average molecular weight of 650 to 3000 g/mol, an acid number of less than 5 and a hydroxyl number of 28 to 112 and each have a functionality of 1.0 to 3.0, and are formed from one or more fatty acids having 10 to 30 carbon atoms, one or more low molecular weight aliphatic and/or aromatic di- and/or tricarboxylic acids each having a number-average molecular weight of 50 to 500 g/mol and/or derivatives thereof and one or more mono- or polyhydric alcohols each having a number-average molecular weight up to 500 g/mol and each having a number-average functionality of 1.5 to 6, wherein the total amount of condensation products having ester groups used in the fiber composite component is 5% to 5.7% by weight and wherein the reaction mixture at 25° C. directly after the mixing has a viscosity of 200 to 700 mPas, preferably 200 to 600 mPas and more preferably 200 to 550 mPas (measured to DIN EN ISO 1342), and the ratio of the number of NCO groups of component A) to the number of OH groups of component B) is 1:1 to 1.15:1, preferably 1.03:1 to 1.08:1.

The fiber-reinforced fiber composite components of the invention are compact and have a high glass transition temperature.

The viscosities are determined in accordance with DIN EN ISO 53019 (plate/plate) ((d/dt=60 l/s): d/dt=shear rate).

The fiber content in the fiber composite component is preferably more than 45% by weight, more preferably more than 50% by weight, based on the total weight of the fiber composite component.

In the case of glass fibers, the fiber content can be determined, for example, by ashing.

The fiber composite components may comprise further commonly known protective and/or decorative layers. These can, for example, be introduced into one or both halves of a mold prior to the introduction of the fiber material and the reaction mixture, for example one or more gelcoat layers. In this way, it is possible to obtain fiber composite components composed of one or more polyurethane-impregnated fiber layers and protective and/or decorative layers. Protective and/or decorative layers may consist of different materials according to the desired properties. Protective and/or decorative layers used may, for example, be commonly known, especially thermoplastic, compact or foamed films, for example films based on acrylonitrile-butadiene-styrene (ABS), polymethyl methacrylate (PMMA), acrylonitrile-styrene-acrylic ester (ASA), polycarbonate (PC), thermoplastic polyurethane, polypropylene, polyethylene and/or polyvinyl chloride (PVC). It is also possible to use coated or painted films. Useful decorative layers additionally also include customary metal foils, for example aluminum foil or steel foil. In addition, it is possible to use flat textiles, paper, wood (e.g. veneers), or else sprayable or RIM skins of polyurethane, as decorative layer. The decorative layer used may also be glass. The decorative surface layer may have been applied to one of the two sides of the fiber composite material or to both sides.

The invention further provides a process for producing the inventive fiber composite components, wherein i) one or more fiber layers are initially charged in one or both halves of a mold, ii) the mold is closed, iii) a reaction mixture consisting of A) one or more organic NCO prepolymers having an NCO content of 27% to 31% by weight and a monomer content of 35% to 55% by weight from the group consisting of reaction products of aliphatic, cycloaliphatic and/or aromatic di- and/or polyisocyanates and 5% to 7.5% by weight, based on component A), of condensation products which have ester groups, each have a number-average molecular weight of 650 to 3000 g/mol, an acid number of less than 5, a hydroxyl number of 28 to 112 and in each case a number-average functionality of 1.0 to 3.0, and are formed from one or more fatty acids having 10 to 30 carbon atoms, one or more low molecular weight aliphatic and/or aromatic di- and/or tricarboxylic acids each having number-average molecular weights of 50 to 500 g/mol and/or derivatives thereof and one or more mono- or polyhydric alcohols each having a number-average molecular weight up to 500 g/mol and each having a number-average functionality of 1.5 to 6, B) a component comprising one or more polyols each having a number-average molecular weight of 62 to 3000 g/mol and each having a number-average functionality of 1.8 to 6, C) two or more thermolatent catalysts, D) optionally additives, wherein component B) contains 2.5% to 3.5% by weight, based on component B), of internal mold release agent and the internal mold release agent is selected from the group consisting of condensation products which have ester groups, each have a number-average molecular weight of 650 to 3000 g/mol, an acid number of less than 5 and a hydroxyl number of 28 to 112 and each have a number-average functionality of 1.0 to 3.0, and are formed from one or more fatty acids having 10 to 30 carbon atoms, one or more low molecular weight aliphatic and/or aromatic di- and/or tricarboxylic acids each having a number-average molecular weight of 50 to 500 g/mol and/or derivatives thereof and one or more mono- or polyhydric alcohols each having a number-average molecular weight up to 500 g/mol and each having a number-average functionality of 1.5 to 6, and wherein the total amount of condensation products having ester groups used in the fiber composite component is 5% to 5.7% by weight and wherein the reaction mixture at 25° C. has a viscosity directly after the mixing of 200 to 700 mPas, preferably 200 to 600 mPas and more preferably 200 to 550 mPas (measured to DIN EN ISO 1342), and the ratio of the number of NCO groups of component A) to the number of OH groups of component B) is 1:1 to 1.15:1, preferably 1.03:1 to 1.08:1, is introduced, optionally under pressure, into the closed mold which is optionally under reduced pressure, which results in impregnation of the one or more fiber layers, and iv) the reaction mixture from iii) is cured at a temperature of 50° C. to 120° C., preferably of 70° C. to 100° C.

Prior to manufacture of a first component, the mold halves may first be treated with a wax and then provided with an additional external mold release agent before the fiber material and the reaction mixture are introduced.

The fiber composite components of the invention can also be produced by commonly known methods, for example manual lamination (wet compression methods), filament winding, transfer molding, mold compression (SMC=sheet molding compound or BMC=bulk molding compound), resin injection methods (=resin transfer molding) or vacuum-assisted infusion methods (for example VARTM (vacuum-assisted resin transfer molding)) or prepreg technology. The high-pressure resin transfer molding (HP-RTM) method is particularly preferred, and is claimed.

According to the HP-RTM method which is preferred for the production of the fiber composite components of the invention, after the one or more fiber layers have been inserted into the mold half, the mold is closed with an opposite half of the mold, a reduced pressure may be generated in the mold, and then the reaction mixture is introduced under pressure. If necessary, what are called flow aids (for example in the form of pressure-stable but resin-permeable mats) can be introduced between the mold halves and the fiber material, and these can be removed again after the curing.

The reaction mixtures used in accordance with the invention have low viscosities, long processing windows and short curing times at low curing temperatures, and hence enable the rapid manufacture of fiber composite components. Furthermore, the manufacture of many components in direct succession without further priming of the mold halves with an external mold release agent is possible and hence increases the productivity. There is also no need for any complex aftertreatment of the fiber composite components, for example by heat treatment or surface cleaning for any subsequent painting/lamination step, which saves time and costs.

The reaction mixtures used in accordance with the invention are initially mobile on introduction, remain mobile for the period of impregnation of the fiber layers, and then cure rapidly. This is advantageous particularly in the case of large components. The viscosity of the reaction mixtures of the invention at 25° C. directly after the mixing is at a value of 200 to 700 mPas, preferably at a value of 200 to 600 mPas.

The viscosity of the reaction mixtures of the invention rises very quickly at temperatures of 50 to 120° C. (called a "snap cure").

Polyisocyanate components A) used are prepolymers formed from customary aliphatic, cycloaliphatic and especially aromatic di- and/or polyisocyanates. Examples of suitable polyisocyanates are butylene 1,4-diisocyanate, pentane 1,5-diisocyanate, hexamethylene 1,6-diisocyanate (HDI), isophorone diisocyanate (IPDI), 2,2,4- and/or 2,4,4-trimethylhexamethylene diisocyanate, the isomers of bis (isocyanatocyclohexyl)methane or mixtures thereof with any isomer content, cyclohexylene 1,4-diisocyanate, phenylene 1,4-diisocyanate, tolylene 2,4- and/or 2,6-diisocyanate (TDI), naphthylene 1,5-diisocyanate, diphenylmethane 2,2'- and/or 2,4'- and/or 4,4'-diisocyanate (MDI) and/or higher homologs (pMDI), 1,3- and/or 1,4-bis(2-isocyanatoprop-2-yl)benzene (TMXDI), 1,3-bis(isocyanatomethyl) benzene (XDI). As well as the aforementioned polyisocyanates, it is also possible to use modified polyisocyanates having uretdione, isocyanurate, urethane, carbodiimide, uretonimine, allophanate or biuret structure. Isocyanates used are preferably diphenylmethane diisocyanate (MDI) and especially mixtures of diphenylmethane diisocyanate and polyphenylenepolymethylene polyisocyanate (pMDI).

Component A) has a content of condensation products having ester groups of 5% to 7.5% by weight and a monomer content of between 35% and 55% by weight, preferably between 40% and 50% by weight, more preferably between 43% and 49% by weight. The NCO content of the prepolymers used is 27% to 31% by weight, preferably more than 28% by weight. The NCO content can be determined to DIN 53185. The viscosity of the prepolymer should preferably be 30 to ≤250 mPas (at 20° C.), more preferably ≤200 mPas (at 20° C.) and especially preferably ≤170 mPas (at 20° C.).

The polyols of component B) have number-average molecular weights $M_n$ of ≥62 g/mol to ≤3000 g/mol. Component B) preferably contains, as polyols, those which have a number-average OH number of 28 to 2000 mg KOH/g, preferably of 40 to 1900 mg KOH/g. The OH number of component B) in the case of a single added polyol is its OH number. In the case of mixtures, the number-average OH number is reported. The value of the OH number can be determined in accordance with DIN 53240. The viscosity of the polyols is preferably 40 to ≤700 mPas (at 25° C.). Component B) has, in the mixture, preferably at least 70% secondary OH groups, more preferably at least 80% secondary OH groups and especially preferably at least 85% secondary OH groups. Polyether polyols based on propylene oxide are particularly preferred. Preferably, the polyols used have a mean functionality of 1.8 to 6.0, more preferably 1.8 to 4.0.

According to the invention, it is possible to use polyether polyols, polyester polyols or polycarbonate polyols. Suitable polyether polyols are addition products of styrene oxide, ethylene oxide, propylene oxide and/or butylene oxide onto di- or polyfunctional starter molecules. Suitable starter molecules are, for example, water, ethylene glycol, diethylene glycol, butyl diglycol, glycerol, diethylene glycol, trimethylolpropane, propylene glycol, pentaerythritol, ethylenediamine, toluenediamine, triethanolamine, butane-1,4-diol, hexane-1,6-diol and low molecular weight hydroxyl-containing esters of such polyols with dicarboxylic acids or oils having hydroxyl groups. It is also possible to use mixtures of polyether polyols and polyester polyols, more preferably condensation products having ester groups.

The internal mold release agents are prepared from the starting materials mentioned by way of example by esterification reactions known per se, for example by heating the starting materials in the presence of catalytic amounts of a Lewis or Brønsted acid, for example sulfuric acid, p-toluenesulfonic acid, tin dichloride or titanium tetrabutoxide, at a pressure of about 1000 to 0.1 mbar at temperatures of up to 220° C., preferably up to 180° C., with simultaneous removal of the water formed in the condensation reaction.

Thermolatent catalysts C) used are preferably catalysts that are catalytically active in the range between 50° C. and 120° C. Typical thermolatent catalysts are, for example, blocked amine and amidine catalysts from the manufacturers Air Products (for example Polycat® SA-1/10 (phenol-blocked 1,8-diazabicyclo[5.4.0]undec-7-ene (=DBU)), Polycat® SA 102/10, Dabco KTM 60, DABCO® 8154 (formic acid-blocked triethylenediamine) or DABCO® WT) and Tosoh Corporation (for example Toyocat® DB 2, DB 30, DB 31, DB 40, DB 41, DB 42, DB 60, DB 70) and Huntsman Corporation (for example Accelerator DY 9577). Particular preference is given to a combination of Polycat® SA1/10 and Toyocat® DB 40 in a ratio of 1:5% by weight. Alternatively, it is possible to use all other typical thermolatent catalysts from polyurethane chemistry having a "switching temperature" of 50° C. to 120° C. It is very particularly advantageous to use at least two thermolatent catalysts having different switching temperatures.

Thermolatent catalysts C) used may be the known catalysts, usually bases (tertiary amines, salts of weak acids, such as potassium acetate) and organic metal compounds. Preferred thermolatently reactive catalysts are salts of tertiary amines. These thermolatently reactive catalysts can be obtained, for example, by chemical blocking of a catalytically active amine. The chemical blocking can be effected by the protonation of a tertiary amine with an acid, for example formic acid, acetic acid, ethylhexanoic acid or oleic acid, or of a phenol or by boron trichloride. Trialkylamines and heterocyclic amines may be used as the amine, for example trimethylamine, triethylamine, tripropylamine, tributylamine, dimethylcyclohexylamine, dimethylbenzylamine, dibutylcyclohexylamine, dimethylethanolamine, triethanolamine, diethylethanolamine, ethyldiethanolamine, dimethylisopropanolamine, dimethyloctylamine, triisopropanolamine, triethylenediamine, tetramethyl-1,3-butane diamine, N,N,N,N-tetramethylethylenediamine, N,N,N',N'-tetramethylhexane-1,6-diamine, N,N,N,N,N"-pentamethyldiethylenetriamine, bis(2-dimethylaminoethoxy)methane, N,N,N'-trimethyl-N'-(2-hydroxyethyl)ethylenediamine, N,N-dimethyl-N',N'-(2-hydroxyethyl)ethylenediamine, tetramethylguanidine, N-methylpiperidine, N-ethylpiperidine, N-methylmorpholine, N-ethylmorpholine, 1,4-dimethylpiperidine, 1,2,4-trimethylpiperidine, N-(2-dimethylaminoethyl)morpholine, 1-methyl-4-(2-dimethylamino) piperidine, 1,4-diazabicyclo[2.2.2]octane, 1,8-diazabicyclo [5.4.0]undec-7-ene and 1,5-diazabicyclo[4.3.0]-5-nonane.

It is optionally possible to add additives D). These are, for example, additional catalysts, deaerators, defoamers, inhibitors, fillers and reinforcers. Further known additives and auxiliaries can be used if required.

To improve fire resistance, flame retardants may additionally be added to the matrix, for example phosphorus compounds, particularly phosphates and phosphonates, and also halogenated polyesters and polyols or chloroparaffins. In addition, it is also possible to add nonvolatile flame retardants such as melamine or expandable graphite, which expands significantly when exposed to flames and in the process seals the surface from further heating.

Fiber materials used for the fiber layers may, for example, be sized or unsized fibers, for example glass fibers, carbon fibers, steel or iron fibers, natural fibers, aramid fibers, polyethylene fibers, basalt fibers or carbon nanotubes (CNTs). Particular preference is given to glass fibers and carbon fibers. The fibers may have lengths of 0.4 to 5000 mm, preferably 0.4 to 3000 mm. It is also possible to use what are called short fibers having a length of 0.4 to 50 mm. Continuous fiber-reinforced composite components can be produced by the use of continuous fibers. The fibers may be arranged in the fiber layer unidirectionally, in random distribution or in interwoven form. In components having a fiber layer composed of multiple plies, there is the option of fiber orientation from ply to ply. It is possible here to produce unidirectional fiber layers, cross-bonded layers or multidirectional fiber layers, with unidirectional or interwoven plies layered one on top of another. Particular preference is given to using semifinished fiber products as fiber material, for example wovens, scrims, braids, mats, nonwovens, loop-drawn knits and loop-formed knits, or 3D semifinished fiber products.

The inventive fiber composite components can be used to produce bodywork components of automobiles or in aircraft construction, to produce rotor blades of wind power plants, and in components for construction of buildings or roads and other highly stressed structures.

The invention is to be illustrated in detail by the examples which follow.

EXAMPLES

Standards and Instruments Used
DSC: DSC Q 20 V24.8 Build 120 instrument from Texas Instruments Viscosity to DIN EN ISO 53019 (d/dt=60 l/s): d/dt=shear rate (viscometer: MCR 501 from Anton Paar)
DIN EN ISO 53765-A-20: A-20=determination of glass transition point with a temperature change of 20 kelvin/second General Method for Production of Polyurethane Sheets
In order to determine the matrix (polyurethane) properties, shaped bodies (sheets) were produced from polyurethane systems of the invention and compared with noninventive systems. The polyol mixture, which contained both an internal mold release agent and the thermolatent catalysts, and the isocyanate component A) were degassed at a pressure of 1 mbar for 20 minutes. 90 g of the polyol mixture prepared are additionally dispensed into a glass bottle to observe the phase stability. The reaction mixture was processed by reactive injection molding methodology. The polyol component and the isocyanate component, by means of a high-pressure metering device, after vigorous mixing in a machine-controlled mixing head, were forced via a restrictor bar gate into a heated sheet mold which had been cleaned beforehand and treated once with external mold release agent with a mold temperature of 80° C. and the dimensions of 300×200×4 mm. The polyol temperature was 48° C.; the isocyanate temperature was 80° C. It was possible to remove the sheets from the mold after 5 minutes.

In addition, the gel time of the homogenized reaction mixture composed of polyol mixture and isocyanate mixture was determined using a gel timer (75 g), and the solidification time was determined at 80° C.

The amounts and properties can be found in the table.

The sheets were used to produce specimens for a tensile test according to DIN EN ISO 527, and the modulus of elasticity, strength and elongation at break were determined.

Both the viscosity of the polyol mixture and the viscosity of the reaction mixture directly after mixing of the components were determined with a rotary viscometer at 25° C. at a shear rate of 60 1/s to DIN EN ISO 1342.

Glass transition temperature was determined by means of DSC analysis (instrument: DSC Q 20 V24.8 Build 120 from Texas Instruments).

NCO conversion was determined by means of FTIR spectroscopy (instrument: Bruker Optik GmbH, Tensor 27).

Surface tension was determined with the aid of a test ink according to DIN ISO 8296.

In the context of this patent application, the NCO/OH index is understood to mean the index that describes the molar ratio of NCO groups used to NCO-reactive hydrogen atoms used. An equivalent amount of NCO groups and NCO-reactive hydrogen atoms corresponds to an NCO/OH index of 1.

For the production of the fiber-reinforced composite components by the high-pressure (HP) RTM method, a glass fiber weave (G430BX-1270, biaxial glass scrim 430 g/m$^2$ from HACOTECH) was introduced into one half of the mold, such that a glass fiber content of about 50% by weight, based on the later component, was attained. The mold was cleaned thoroughly beforehand, treated with an Ewomold 5716 wax (from KVS) and primed once with the external mold release agent Acmos 36-4570 (from Acmos Chemie). The mold was then closed and heated to 80° C. and then the reaction mixture was injected under pressure into the mold, and the finished fiber composite component was demolded after 5 minutes. It was possible to produce and remove more than 20 moldings without repriming the mold.

The mechanical measurements were made on the fiber-reinforced specimens. Glass fiber content was determined by ashing the specimens in accordance with DIN EN ISO 1172. Modulus of elasticity, strength and elongation at break were determined in accordance with DIN EN ISO 527.

Example 1: Production of Fiber-Reinforced Polyurethane Sheets 63.2 g of a polyether polyol having an OH number of 400 mg KOH/g and a functionality of 3 (viscosity at 25° C.: 370±30 mPas; glycerol as starter; based on propylene oxide), 22.0 g of a polyether polyol having an OH number of 515 mg KOH/g and a functionality of 2 (viscosity at 25° C.: 60±20 mPas; 1,2-propylene glycol as starter; based on propylene oxide) and 10 g of glycerol (OH number of 1827 mg KOH/g and a functionality of 3, viscosity at 25° C.: 1480±50 mPas) were mixed with 3 g of a polyester polyol having an OH number of 52 mg KOH/g, an acid number of 2 mg KOH/g and a functionality of 1.3 (internal mold release agent consisting of oleic acid, adipic acid and pentaerythritol, viscosity at 25° C.: 500 mPas) and with 0.05 g of Polycat SA1/10 (thermolatent catalyst from Air Products, phenol salt of 1,8-diazabicyclo[5.4.0]undec-7-ene in dipropylene glycol), and also with 0.25 g of Toyocat DB40 (thermolatent catalyst (blocked amine) from TOSOH Corporation), and degassed at a pressure of 1 mbar for 20 minutes. Thereafter, 149.1 g of Desmodur® 44P01 (polyisocyanate from Bayer MaterialScience AG; f=2.68; NCO content 29.15% by weight; viscosity at 20° C.: 135 mPas) were added to the polyol formulation and used to produce a fiber-reinforced component with the reaction mixture.

Comparative Example 2: Production of Fiber-Reinforced Polyurethane Sheets (without Internal Mold Release Agent)

63.2 g of a polyether polyol having an OH number of 400 mg KOH/g and a functionality of 3 (viscosity at 25° C.: 370±30 mPas; glycerol as starter; based on propylene oxide), 22.0 g of a polyether polyol having an OH number of 515 mg KOH/g and a functionality of 2 (viscosity at 25° C.: 60±20 mPas; 1,2-propylene glycol as starter; based on propylene oxide) and 10 g of glycerol (OH number of 1827 mg KOH/g and a functionality of 3, viscosity at 25° C.: 1480±50 mPas) were mixed with 0.05 g of Polycat SA1/10 (latent catalyst from Air Products, phenol salt of 1,8-diazabicyclo[5.4.0]undec-7-ene in dipropylene glycol) and 0.25 g of Toyocat DB40 (latent catalyst (blocked amine) from TOSOH Corporation), and degassed at a pressure of 1 mbar for 20 minutes. Thereafter, 147.8 g of Desmodur® 44P01 (polyisocyanate from Bayer MaterialScience AG; f=2.68; NCO content 29.15% by weight; viscosity at 20° C.: 135 mPas) were added to the polyol formulation and used to produce a fiber-reinforced component with the reaction mixture by the HP-RTM method.

Comparative Example 3: Production of Fiber-Reinforced Polyurethane Sheets (Excess of Internal Mold Release Agent)

63.2 g of a polyether polyol having an OH number of 400 mg KOH/g and a functionality of 3 (viscosity at 25° C.: 370±30 mPas; glycerol as starter; based on propylene oxide), 22.0 g of a polyether polyol having an OH number of 515 mg KOH/g and a functionality of 2 (viscosity at 25° C.: 60±20 mPas; 1,2-propylene glycol as starter; based on propylene oxide) and 10 g of glycerol (OH number of 1827 mg KOH/g and a functionality of 3, viscosity at 25° C.: 1480±50 mPas) were mixed with 5 g of a polyester polyol having an OH number of 52 mg KOH/g, an acid number of 2 mg KOH/g and a functionality of 1.3 as internal mold release agent consisting of oleic acid, adipic acid and pentaerythritol, viscosity at 25° C.: 500 mPas, and with 0.05 g of Polycat SA1/10 (thermolatent catalyst from Air Products, phenol salt of 1,8-diazabicyclo[5.4.0]undec-7-ene in dipropylene glycol), and also with 0.25 g of Toyocat DB40 (thermolatent catalyst (blocked amine) from TOSOH Corporation), and degassed at a pressure of 1 mbar for 20 minutes. Thereafter, 148.5 g of Desmodur® 44P01 (polyisocyanate from Bayer MaterialScience AG; f=2.68; NCO content 29.15% by weight; viscosity at 20° C.: 135 mPas) were added to the polyol formulation and used to produce a fiber-reinforced component with the reaction mixture.

Comparative Example 4: Production of Fiber-Reinforced Polyurethane Sheets (Polyisocyanurate)

60 g of a polyether polyol having an OH number of 56 mg KOH/g and a functionality of 2 (viscosity at 25° C.: 400±50 mPas; 1,2-propylene glycol as starter; based on propylene oxide) were mixed with 26 g of Eurepox® 710 (bisphenol A epichlorohydrin resin with average molecular weight ≤700 g/mol; epoxy equivalent 183-189 g/eq; viscosity at 25° C.: 10 000-12 000 mPas) and 250 ppm of methyl para-toluene-sulfonate, and degassed at a pressure of 1 mbar for 60 minutes. Thereafter, 214 g of Desmodur® VP.PU 60RE11 (polyisocyanate from Bayer MaterialScience AG; mixture of diphenylmethane diisocyanate and polyphenylene polymethylene polyisocyanate; NCO content 32.6% by weight; viscosity at 25° C.: 20 mPas) were mixed with 6 g of DY 9577® (trichloro(N,N-dimethyloctylamino)boron from Huntsman Corporation, m.p. 25-36° C.), added to the polyol formulation and degassed at 1 mbar while stirring for 5 minutes. Thereafter, the reaction mixture was used to produce a fiber-reinforced component.

Comparative Example 5: Production of Fiber-Reinforced Polyurethane Sheets (with Internal Mold Release Agent and a Thermolatent Catalyst)

63.2 g of a polyether polyol having an OH number of 400 mg KOH/g and a functionality of 3 (viscosity at 25° C.: 370±30 mPas; glycerol as starter; based on propylene oxide), 22.0 g of a polyether polyol having an OH number of 515 mg KOH/g and a functionality of 2 (viscosity at 25° C.: 60±20 mPas; 1,2-propylene glycol as starter; based on propylene oxide) and 10 g of glycerol (OH number of 1827 mg KOH/g and a functionality of 3, viscosity at 25° C.: 1480±50 mPas) were mixed with 3 g of a polyester polyol having an OH number of 52 mg KOH/g, an acid number of 2 mg KOH/g and a functionality of 1.3 (internal mold release agent consisting of oleic acid, adipic acid and pentaerythritol, viscosity at 25° C.: 500 mPas) and with 0.40 g of Toyocat DB40 (latent catalyst (blocked amine) from TOSOH Corporation), and degassed at a pressure of 1 mbar for 20 minutes. Thereafter, 149.1 g of Desmodur® 44P01 (polyisocyanate from Bayer MaterialScience AG; f=2.68; NCO content 29.15% by weight; viscosity at 20° C.: 135 mPas; prepolymer with internal mold release agent) were added to the polyol formulation and used to produce a fiber-reinforced component with the reaction mixture.

TABLE

| | Example 1 | Comparative example 2 | Comparative example 3 | Comparative example 4 | Comparative example 5 |
|---|---|---|---|---|---|
| NCO/OH equivalents ratio | 1.05 | 1.05 | 1.05 | 12.4 | 1.05 |
| Viscosity of the polyol formulation at 25° C. [mPas] | 326 | 350 | 320 | 360 | 323 |
| Viscosity of the reaction mixture at 25° C. (directly after mixing) [mPas] | 532 | 509 | 491 | 320 | 560 |
| Viscosity at 25° C. (60 min after mixing) [mPas] | solid | solid | solid | 320 | solid |
| Pot life at 25° C. | 14 min 45 sec | 13 min 35 sec | 12 min 55 sec | >24 h | 14 min 15 sec |
| Solidification time at 80° C. [sec] | 66 | 64 | 75 | 7800 | 75 |
| Parts by weight of internal mold release agent on the polyol side | 3 | 0 | 5 | 0 | 3 |
| Parts by weight of condensation product having ester groups in the prepolymer | 6.85 | 6.85 | 6.85 | 0 | 6.85 |
| Total proportion of IMR in the finished component [%] | 5.33 | 4.16 | 6.09 | 0 | 5.33 |
| Phase stability of the polyol after 60 minutes | stable | stable | unstable | stable | stable |
| Demoldings without repriming of the mold | >20 moldings | 1 molding | >20 moldings | 1 molding | <20 moldings |
| Demolding time [min] | 5 min (80° C.) | 5 min (80° C.) | 5 min (80° C.) | 15 min (130° C.) | 8 min (80° C.) |
| NCO conversion directly after demolding (without heat treatment) | 93.4% | 92.6% | 93.1% | 75% | 90% |
| Surface tension [mN/m] | 34 | 34 | 29 | 35 | 34 |
| Glass transition temperature $T_g$ [° C.] to DIN EN ISO 53765 | 110 | 98 | 99 | 146 | 90 |
| Modulus of elasticity to DIN ISO 527 (pure resin sheets) [MPa] | 2850 | 2820 | 2635 | 2300 | 2500 |
| Tensile strength [MPa] DIN ISO 527 (pure resin sheets) | 71 | 78.4 | 68.8 | 94 | 68.5 |
| Elongation at break [%] DIN ISO 527 (pure resin sheets) | 4.9 | 5.3 | 5.1 | 5.4 | 5.7 |
| Glass fiber content to DIN EN ISO 1172 [% by wt.] (fiber composite component) | 55 | 54 | 54 | 50 | 55 |
| Modulus of elasticity to DIN ISO 527 (fiber composite component) [MPa] | 23815 | 23419 | 21625 | 23950 | 23676 |
| Tensile strength [MPa] to ISO 527 (fiber composite component) | 445 | 425 | 324 | 297 | 462 |
| Tensile elongation [%] to ISO 527 (fiber composite component) | 2.2 | 2.5 | 3.4 | 1.5 | 2.5 |

Inventive example 1 gave a compact polyurethane sheet having very good mechanical properties (modulus of elasticity of 2850 MPa, tensile strength of 71 MPa and elongation at break of 4.9%). In addition, the polyurethane used in accordance with the invention (matrix system) has a high glass transition temperature of 110° C. For the production of fiber-reinforced composite components, a very low viscosity in particular is needed, since this allows the fiber scrim or fabric to be soaked or impregnated more easily and better, and the molds can be filled much more quickly and homogeneously. This additionally enables shorter cycle times since the molds are only occupied for a short time. However, a long pot life is desirable for large fiber composite components in particular. In inventive example 1, the pot life at room temperature is 14 minutes and 45 seconds. The polyol formulation of the polyurethane system used in accordance with the invention is phase-stable, meaning that there is no phase separation in spite of the internal mold release agent present even after prolonged shelf life/storage at room temperature. An additional advantage is that more than 20 demolding operations of the polyurethane sheets are possible after only a short curing time of less than 5 minutes at a low curing temperature of 80° C. The surface tension is very high at 34 mN/m, and so the components can be painted directly after demolding without further aftertreatment, for example by storage, sandblasting or the like. This leads to a distinct saving of time and costs in the production of fiber composite components on the industrial scale. Further heat treatment of the polyurethane sheet of the invention was unnecessary since the NCO conversion is already very high at 93.4% compared to comparative example 4 (polyisocyanurate component, 75% NCO conversion). The compact fiber composite component of the invention which has been produced has very good mechanical properties: modulus of elasticity of 23 815 MPa, tensile strength of 445 MPa and flexural strain of 2.2%.

In comparative example 2, the internal mold release agent was completely omitted on the polyol side. The viscosities of the polyol formulation and the reaction mixture were very similar to those from inventive example 1. The mechanical properties both of the polyurethane sheet and of the fiber composite components were also in a similar range. However, the omission of the internal mold release agent distinctly reduced the number of the moldable sheets, such that the mold had to be reprimed with the external mold release agent after every sheet in comparative example 2. This led to much more time-consuming manufacture of the fiber composite components. The mechanical properties both of the pure resin sheets and of the fiber composite components are similar to inventive example 1. Only the glass transition temperature at 98° C. is much lower in the comparative example than in inventive example 1.

In comparative example 3, the content of internal mold release agent on the polyol side was increased from 3 to 5 parts by weight. The viscosities are likewise in a similar range to those in inventive example 1, except that phase separation took place directly after the production of the polyol formulation because of the increased proportion of internal mold release agent. Because of this phase separation, continuous processing is was impossible. In addition, the moldings, after they have been produced, have a surface tension of 29 mN/m, such that these components without further aftertreatment have much poorer paint adhesion than the components from inventive example 1. The modulus of elasticity of the pure resin sheet and the fiber composite component of comparative example 3, at 2635 MPa and 21 625, are also well below the values from inventive example 1.

The content of internal mold release agent on the polyol side was varied in comparative examples 2 and 3. The measured data show clearly that a phase-stable polyol component and a high surface tension can be obtained only within a narrow range of amounts of condensation products having ester groups in the finished component.

Comparative example 4 describes a polyisocyanurate component which has been produced by the HP-RTM method. In comparative example 4, a very much higher mold temperature of 130° C. was required. The demolding time at this temperature, at 15 minutes, is three times as long as in inventive example 1. The demolded component has a very much lower NCO conversion of 75%. The polyisocyanurate-based components had to be subjected to further heat treatment for a few hours. This constitutes a very time-consuming and costly step which should be avoided. Moreover, the modulus of elasticity of the pure resin sheet, at 2300 MPa, is well below that from inventive example 1.

In comparative example 5, one of the two latent catalysts, Polycat SA1/10, was omitted and the proportion of the second latent catalyst, Toyocat DB40, was increased in an equimolar manner. The solidification time increases from 66 seconds (inventive example 1) to 75 seconds (comparative example 5). In addition, fewer than 20 moldings can be demolded without repriming the mold. There is a distinct rise in the demolding time at 80° C. to 8 minutes. Both the glass transition temperature (90° C.) and the modulus of elasticity of the pure resin sheet (2500 MPa) are much lower compared to the inventive system from example 1.

The very good mechanical parameters, the good phase stability in the polyol, the high surface tension and the high NCO conversion in combination with a very low initial viscosity of 532 mPas at 25° C. and hence good fiber wetting during component production lead to high productivity in the production of fiber-reinforced components, and were achieved only in the inventive example.

The invention claimed is:
1. A fiber composite component based on polyurethane, comprising one or more fiber layers each impregnated with polyurethane, wherein the polyurethane is obtained from a reaction mixture consisting of:
A) one or more organic NCO prepolymers having an NCO content of 27% to 31% by weight and a monomer content of 35% to 55% by weight, wherein the NCO prepolymers comprise a reaction product of:
aliphatic, cycloaliphatic, and/or aromatic di-isocyanates and/or polyisocyanates, and
5% to 7.5% by weight, based on component A), of condensation products which have ester groups, each condensation product having a number-average molecular weight of 650 to 3000 g/mol, an acid number of less than 5, a hydroxyl number of 28 to 112, and in each case a number-average functionality of 1.0 to 3.0, and wherein the condensation products are formed from:
one or more fatty acids having 10 to 30 carbon atoms, one or more low molecular weight aliphatic and/or aromatic di-carboxylic and/or tricarboxylic acids each having number-average molecular weights of 50 to 500 g/mol, and/or derivatives thereof, and
one or more mono-hydric or polyhydric alcohols each having a number-average molecular weight up to 500 g/mol and each having a number-average functionality of 1.5 to 6,

B) a component comprising one or more polyols each having a number-average molecular weight of 62 to 3000 g/mol and each having a number-average functionality of 1.8 to 6, C) two or more thermolatent catalysts, and D) optionally additives, wherein component B) contains 2.5% to 3.5% by weight, based on component B), of an internal mold release agent, wherein the internal mold release agent comprises condensation products which have ester groups, each condensation product having a number-average molecular weight of 650 to 3000 g/mol, an acid number of less than 5, a hydroxyl number of 28 to 112, and a number-average functionality of 1.0 to 3.0, and wherein the condensation products are formed from:

one or more fatty acids having 10 to 30 carbon atoms, one or more low molecular weight aliphatic and/or aromatic di-carboxylic and/or tricarboxylic acids each having a number-average molecular weight of 50 to 500 g/mol, and/or derivatives thereof, and one or more mono-hydric or polyhydric alcohols each having a number-average molecular weight up to 500 g/mol and each having a number-average functionality of 1.5 to 6, wherein the total amount of the condensation products having ester groups used in the fiber composite component is 5% to 5.7% by weight, and wherein the reaction mixture at 25° C. has a viscosity directly after the mixing of 200 to 700 mPas (measured according to DIN EN ISO 1342) and the ratio of the number of NCO groups of component A) to the number of OH groups of component B) is 1:1 to 1.15:1.

2. A process for producing the fiber composite components as claimed in claim 1, comprising:

i) charging one or more fiber layers in one or both halves of a mold, ii) closing the mold, and iii) introducing into the closed mold a reaction mixture consisting of:

A) one or more organic NCO prepolymers having an NCO content of 27% to 31% by weight and a monomer content of 35% to 55% by weight, wherein the NCO prepolymers comprise a reaction product of:

aliphatic, cycloaliphatic, and/or aromatic di-isocyanates and/or polyisocyanates, and 5% to 7.5% by weight, based on component A), of condensation products which have ester groups, each condensation product having a number-average molecular weight of 650 to 3000 g/mol, an acid number of less than 5, a hydroxyl number of 28 to 112, and in each case a number-average functionality of 1.0 to 3.0, and wherein the condensation products are formed from:

one or more fatty acids having 10 to 30 carbon atoms, one or more low molecular weight aliphatic and/or aromatic di-carboxylic and/or tricarboxylic acids each having number-average molecular weights of 50 to 500 g/mol, and/or derivatives thereof, and one or more mono-hydric or polyhydric alcohols each having a number-average molecular weight up to 500 g/mol and each having a number-average functionality of 1.5 to 6, B) a component comprising one or more polyols each having a number-average molecular weight of 62 to 3000 g/mol and each having a number-average functionality of 1.8 to 6, C) two or more thermolatent catalysts, D) optionally additives, wherein component B) contains 2.5% to 3.5% by weight, based on component B), of an internal mold release agent, wherein the internal mold release agent comprises condensation products which have ester groups, each condensation product having a number-average molecular weight of 650 to 3000 g/mol, an acid number of less than 5, a hydroxyl number of 28 to 112, and a number-average functionality of 1.0 to 3.0, and wherein the condensation products are formed from:

one or more fatty acids having 10 to 30 carbon atoms, one or more low molecular weight aliphatic and/or aromatic di-carboxylic and/or tricarboxylic acids each having a number-average molecular weight of 50 to 500 g/mol, and/or derivatives thereof, and one or more mono-hydric or polyhydric alcohols each having a number-average molecular weight up to 500 g/mol and each having a number-average functionality of 1.5 to 6, and wherein the total amount of condensation products having ester groups used in the fiber composite component is 5% to 5.7% by weight, and wherein the reaction mixture at 25° C. has a viscosity directly after the mixing of 200 to 700 mPas (measured according to DIN EN ISO 1342) and the ratio of the number of NCO groups of component A) to the number of OH groups of component B) is 1:1 to 1.15:1, and wherein introducing the reaction mixture results in impregnation of the one or more fiber layers, and iv) curing the reaction mixture from iii) at a temperature of 50° C. to 120° C.

3. The process of claim 2, wherein the reaction mixture is cured at a temperature of 70° C. to 100° C.

4. The process of claim 2, wherein the reaction mixture is under pressure when the reaction mixture is introduced into the closed mold.

5. The process of claim 2, wherein the closed mold is under reduced pressure when the reaction mixture is introduced into the closed mold.

6. The process of claim 2, wherein the reaction mixture is cured at a temperature of 70° C. to 100° C., wherein the reaction mixture is under pressure when the reaction mixture is introduced into the closed mold, and wherein the closed mold is under reduced pressure when the reaction mixture is introduced into the closed mold.

* * * * *